(12) United States Patent
Yang (10) Patent No.: US 12,316,095 B2
(45) Date of Patent: May 27, 2025

(54) SOLID-STATE CIRCUIT BREAKER HAVING A SEALED VACUUM GAP SECTION FOR PROVIDING AN INTRINSIC SAFE OPERATION

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 189 days.

(21) Appl. No.: 18/194,046

(22) Filed: Mar. 31, 2023

(65) Prior Publication Data

US 2024/0332948 A1  Oct. 3, 2024

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC .......... H02H 3/20; H02H 1/0007; H01H 1/26; H01H 9/341; H01H 33/66261; H01H 33/664; H01H 33/6661; H01H 9/548
See application file for complete search history.

(56) References Cited

U.S. PATENT DOCUMENTS

| | | | |
|---|---|---|---|
| 9,373,473 B2 | 6/2016 | Dupraz et al. | |
| 10,418,192 B1 | 9/2019 | Yang | |
| 11,177,099 B2 | 11/2021 | Davidson | |
| 11,398,724 B1 | 7/2022 | Yang | |
| 2020/0403396 A1* | 12/2020 | Chen | H02H 1/0007 |
| 2021/0066013 A1* | 3/2021 | Kumar | H01H 71/123 |
| 2021/0082643 A1* | 3/2021 | Davidson | H01H 9/542 |
| 2023/0361560 A1* | 11/2023 | Yang | H02H 3/33 |
| 2024/0305086 A1* | 9/2024 | Yang | H02H 9/043 |
| 2024/0321540 A1* | 9/2024 | Yang | H01H 33/596 |

FOREIGN PATENT DOCUMENTS

| | | | | |
|---|---|---|---|---|
| EP | 2736060 A1 | 5/2014 | | |
| EP | 2510598 B1 * | 7/2014 | | H02H 3/06 |

\* cited by examiner

*Primary Examiner* — Jared Fureman
*Assistant Examiner* — Nicolas Bellido (57) ABSTRACT

A solid-state circuit breaker comprises a sensing and control circuit configured to realize designed functions, a power electronics section that includes solid-state switching components for normal operations and a vacuum gap section that includes a sealed vacuum tube. The vacuum gap section is disposed in series with the power electronics section. The vacuum gap section is configured to open to interrupt a current such that the associated arcs are contained in the sealed vacuum tube.

18 Claims, 5 Drawing Sheets

SOLID-STATE CIRCUIT BREAKER HAVING A SEALED VACUUM GAP SECTION FOR PROVIDING AN INTRINSIC SAFE OPERATION

BACKGROUND

1. Field

Aspects of the present invention generally relate to a solid-state circuit breaker including a vacuum gap section that has a sealed vacuum tube for providing an intrinsic safe solid-state circuit breaker in that the vacuum gap section is configured to open to interrupt a load current such that the associated arcs are contained in the sealed vacuum tube.

2. Description of the Related Art

Solid-state circuit breakers use power electronics as switching components instead of contacts as in traditional thermal-magnetic circuit breakers, and the switching process is arc free. Therefore, solid state circuit breakers show promising aspects for use in both AC and DC systems. In particular, for applications, such as environment with possible explosive gas, solid-state circuit breakers show great advantages over traditional contact-based circuit breakers due to the arc free switching. However, solid-state circuit breakers are required to implement an air gap for isolation purposes. The air gap is a mechanical contact system and opens after main power electronics have interrupted load current. Therefore, in normal operations, the air gap doesn't create any arcs. In the situation when the main power electronics have failed, the air gap is also used as a backup switching mechanism to interrupt the current and creates an open arc during the process. As a result, the overall circuit breaker cannot be considered intrinsic safe or explosion proof.

For explosion proof purposes, currently an explosion proof enclosure is used with heavy gauge metal. Such explosion proof enclosures are bulky and expensive.

Therefore, there is a need for an improved system architecture for a solid-state circuit breaker.

SUMMARY

Briefly described, aspects of the present invention relate to a solid-state circuit breaker for DC applications. In this invention, a vacuum gap is used instead of an air gap to avoid any open arcs. Therefore, the overall circuit breaker can be considered intrinsic safe. Furthermore, use of a vacuum condition significantly reduces a contact separation distance needed for interruption, which in turn results in a smaller and easier to design driving mechanism when compared to a simply concealed air gap. Providing an intrinsic safe circuit breaker is a much more cost effective and space saving method.

In accordance with one illustrative embodiment of the present invention, a solid-state circuit breaker is provided. It comprises a sensing and control circuit configured to realize designed functions, a power electronics section that includes solid-state switching components for normal operations and a vacuum gap section that includes a sealed vacuum tube. The vacuum gap section is disposed in series with the power electronics section. The vacuum gap section is configured to open to interrupt a current such that the associated arcs are contained in the sealed vacuum tube.

In accordance with one illustrative embodiment of the present invention, a method for providing an intrinsic safe solid-state circuit breaker is provided. The method comprises providing a sensing and control circuit configured to realize designed functions. The method further comprises providing a power electronics section that includes solid-state switching components for normal operations. The method further comprises providing a vacuum gap section that includes a sealed vacuum tube. The vacuum gap section is disposed in series with the power electronics section. The vacuum gap section is configured to open to interrupt a current such that the associated arcs are contained in the sealed vacuum tube.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate a solid-state circuit breaker to become intrinsic safe will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an intrinsic safe solid-state circuit breaker that includes a vacuum gap section with a sealed vacuum tube. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the solid-state circuit breaker according to the present disclosure are described below with reference to FIGS. 1-7 herein. Like reference numerals used in the drawings identify similar or identical elements throughout the several views. The drawings are not necessarily drawn to scale.

Figure 1:
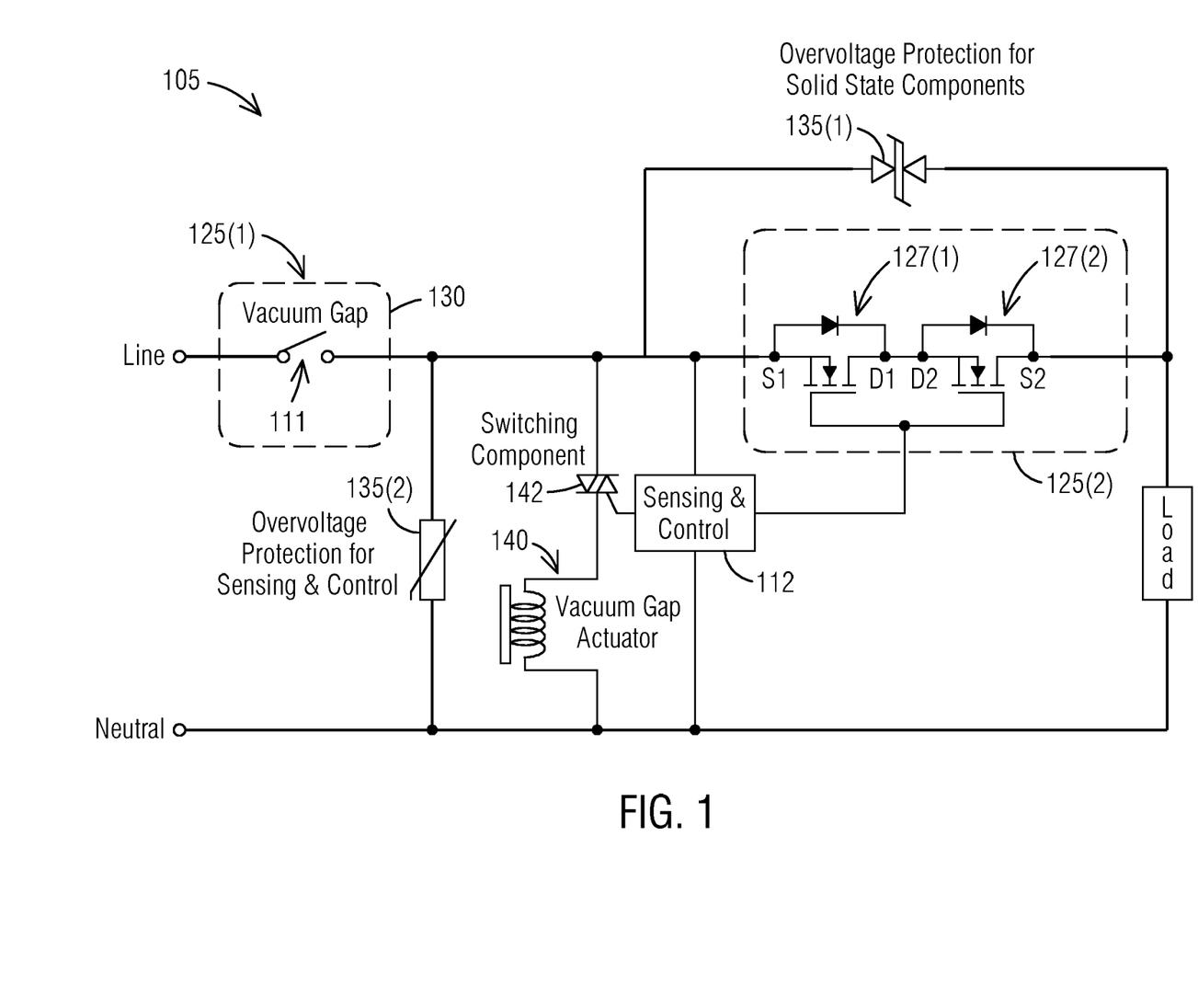
FIG. 1 illustrates a solid-state circuit breaker with a vacuum gap in accordance with an exemplary embodiment of the present invention.

Consistent with one embodiment of the present invention, FIG. 1 represents a solid-state circuit breaker 105 in accordance with an exemplary embodiment of the present invention. The solid-state circuit breaker 105 provides intrinsic safe functionality via a vacuum gap 111 of a vacuum gap section 125(1). FIG. 1 shows a common structure of the solid-state circuit breaker 105. The vacuum gap 111 is placed in series to a power electronics section 125(2). The solid-state circuit breaker 105 further comprises a sensing and control circuit 112 configured to realize designed functions. The sensing and control circuit 112 is used to control the power electronics section 125(2) and the vacuum gap 111 according to pre-determined operation sequences under different conditions, such as normal, overload and short circuit. In case of shorted the power electronics section 125(2), the vacuum gap 111 opens the circuit to interrupt a load current. It should be noted that sensing and control circuit 112 in these diagrams are for demonstration purposes only, there are various ways to power sensing and control than shown in the figures.

In this case, especially for low voltage, low current applications, the vacuum gap 111 can be greatly simplified comparing to the more often used construction in medium voltage applications. An example of the vacuum gap section 125(1) may be a low voltage low current vacuum interrupter.

The solid-state circuit breaker 105 comprises the sensing and control circuit 112 configured to realize designed functions. The solid-state circuit breaker 105 comprises the power electronics section 125(2) that includes solid-state switching components 127(1-2) for normal operations.

The solid-state circuit breaker 105 comprises the vacuum gap section 125(1) that includes a sealed vacuum tube 130. The vacuum gap section 125(1) is disposed in series with the power electronics section 125(2). The vacuum gap section 125(1) is configured to open to interrupt a current such that the associated arcs are contained in the sealed vacuum tube 130. In case of shorted power electronics, the vacuum gap 111 opens to interrupt the current. However, the associated arcs are contained in the vacuum tube, and hence the overall circuit breaker is intrinsic safe.

The solid-state circuit breaker 105 further comprises a first overvoltage protection device 135(1) in parallel to the solid-state switching components 127(1-2). The solid-state switching components 127(1-2) includes a first solid-state component 127(1) and a second solid-state component 127(2). The first overvoltage protection device 135(1) is provided to protect the solid-state switching components 127(1-2) during an overvoltage after interruptions.

The solid-state circuit breaker 105 further comprises a second overvoltage protection device 135(2) for protecting the sensing and control circuit 112. The solid-state circuit breaker 105 further comprises a vacuum gap actuator 140 placed in series with a switching component, 142 and both disposed in parallel to the sensing and control circuit 112. The first and second solid-state components 127(1-2) may be a single component or multiple components connected in parallel.

Figure 2:
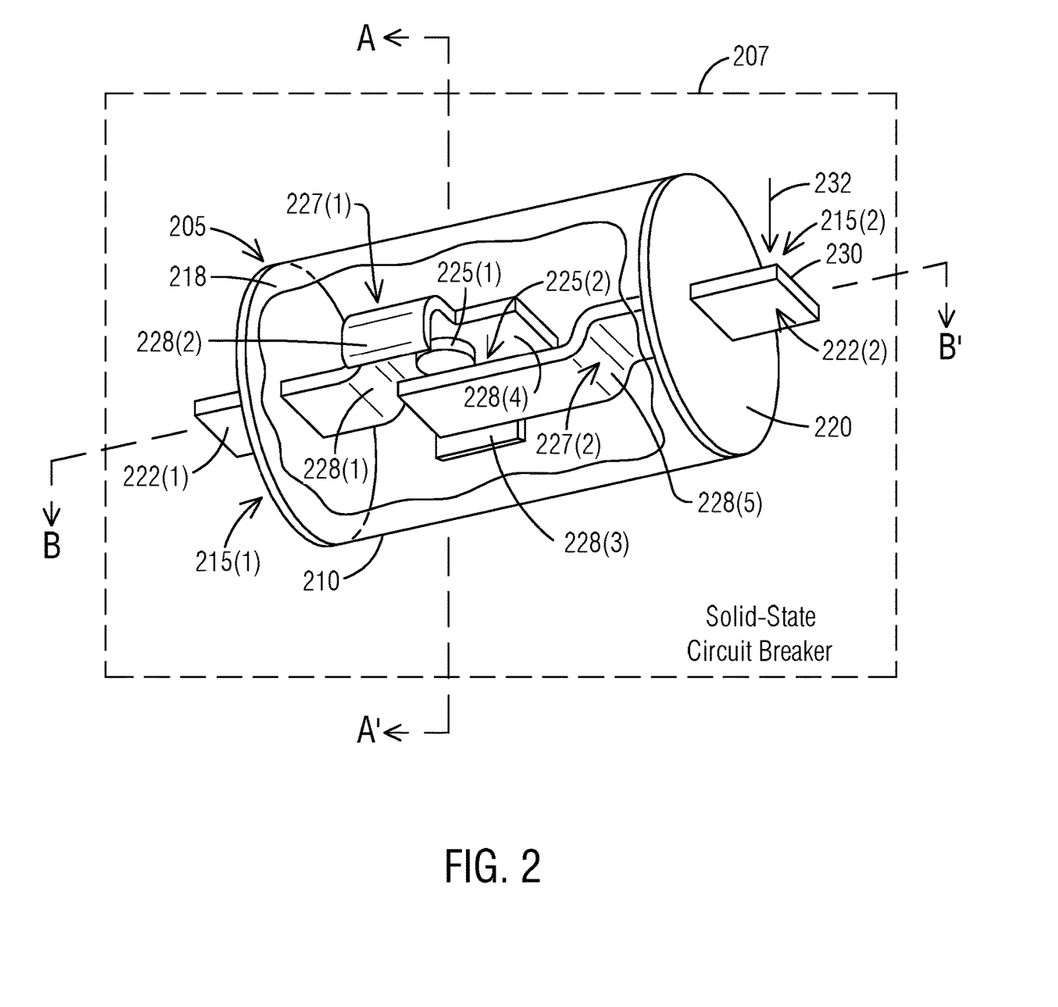
FIG. 2 illustrates a perspective view of a vacuum gap section for use in a solid-state circuit breaker in accordance with an exemplary embodiment of the present invention.

Referring to FIG. 2, it illustrates a perspective view of a vacuum gap section 205 for use in a solid-state circuit breaker 207 in accordance with an exemplary embodiment of the present invention. The solid-state circuit breaker 207 comprises the vacuum gap section 205 including a sealed vacuum tube 210 comprising at least one of a group of materials including a glass, a ceramic, a metal, an alloy and a glass-ceramic. Glass can be called as a type of ceramic. Glass is known to be a non-crystalline material. It is an amorphous solid, which means that it has no long-range order of positioning of its molecules.

Unlike glass, ceramics may have crystalline or partly crystalline structures. A ceramic material is an inorganic, non-metallic, often crystalline oxide, nitride or carbide material. Some elements, such as carbon or silicon, may be considered ceramics. Ceramic materials are brittle, hard, and strong in compression, weak in shearing and tension. The crystallinity of ceramic materials ranges from highly oriented to semi-crystalline, vitrified, and often completely amorphous (e.g., glasses). Most often, fired ceramics are either vitrified or semi-vitrified. Varying crystallinity and electron consumption in the ionic and covalent bonds cause most ceramic materials to be good thermal and electrical insulators. Ceramics generally can withstand very high temperatures, such as temperatures that range from 1,000° C. to 1,600° C. (1,800° F. to 3,000° F.). Glass is often not considered a ceramic because of its amorphous (non-crystalline) character. However, glassmaking involves several steps of the ceramic process and its mechanical properties are similar to ceramic materials. Crystalline ceramic materials are not amenable to a great range of processing. The glass is shaped when either fully molten, by casting, or when in a state of toffee-like viscosity, by methods such as blowing into a mold. If later heat treatments cause this glass to become partly crystalline, the resulting material is known as a glass-ceramic.

Glass-ceramics have an amorphous phase and one or more crystalline phases and are produced by a so-called "controlled crystallization" in contrast to a spontaneous crystallization, which is usually not wanted in glass manufacturing. Glass-ceramic commonly referred to as glass but it is actually a transparent ceramic. Unlike true glass, ceramics can withstand continuous exposure to high temperatures without fear of destruction. It is also resistant to failure due to temperature variation. Glass-ceramic is a little different. Formed in a two step process, glass-ceramic encourages crystalline growth in the second phase of production. In this process the growth of crystals is controlled, allowing uniform growth within the glass. Ordinarily crystal growth isn't a good thing, but with glass-ceramic you get the advantages of glass with the durability of ceramics.

In one embodiment, the sealed vacuum tube 210 has a first end 215(1) and a second end 215(2) such that the sealed vacuum tube 210 is being closed at the first end 215(1) with an end plate 218 and closed at the second end 215(2) with an end spring 220. The vacuum gap section 205 further comprises a first contact terminal 222(1) passing through the end plate 218 and having a fixed contact 225(1) near a distal end of the first contact terminal 222(1). The first contact terminal 222(1) has a first feature 227(1) to protect from arcs by limiting access of the arcs to other components. The vacuum gap section 205 further comprises a second contact terminal 222(2) having a free end 230. The second contact terminal 222(2) passing through the end spring 220 and having a movable contact 225(2) being configured to contact the fixed contact 225(1) of the first contact terminal 222(1). The second contact terminal 222(2) has a second feature 227(2) to protect from the arcs by limiting access of the arcs to the other components.

The first feature 227(1) to protect from the arcs includes a first bend 228(1) on the first contact terminal 222(1), first and second wings 228(2-3) on the first contact terminal 222(1), and an extension 228(4) on the first contact terminal 222(1). The second feature 227(2) to protect from the arcs includes a second bend 228(5) on the second contact terminal 222(2) being a movable arm.

The fixed contact 225(1) is mounted on the first contact terminal 222(1) which is in turn mounted on the end plate 218. The fixed contact 225(1) may be welded on the first contact terminal 222(1). The fixed contact may be riveted on the first contact terminal 222(1). The first contact terminal 222(1) may be brazed on the end plate 218 and the end plate 218 is sealed on the sealed vacuum tube 210. The first contact terminal 222(1) may be soldered on the end plate 218 and the end plate 218 is sealed on the sealed vacuum tube 210.

The movable contact 225(2) is mounted on the second contact terminal 222(2) being a movable arm which is mounted on the end spring. The movable contact 225(2) may be welded on the movable arm. The movable contact 225(2) may be riveted on the movable arm. The movable arm may be brazed on the end spring 220 and the end spring 220 is sealed on the sealed vacuum tube 210. The movable arm may be soldered on the end spring 220 and the end spring 220 is sealed on the sealed vacuum tube 210.

The end spring 220 is configured to receive a force 232 on the free end 230 of the second contact terminal 222(2) to provide open or close operations of the vacuum gap section 205. By moving a portion of the movable arm, the movable contact 225(2) is configured to be opened or closed onto the fixed contact 225(1). The end spring 220 deforms in response to the force 232 The end spring 220 has a material, a thickness and a diameter which are chosen in such a way that the end spring 220 stays in an elastic range during the open or close operations.

Figure 3:
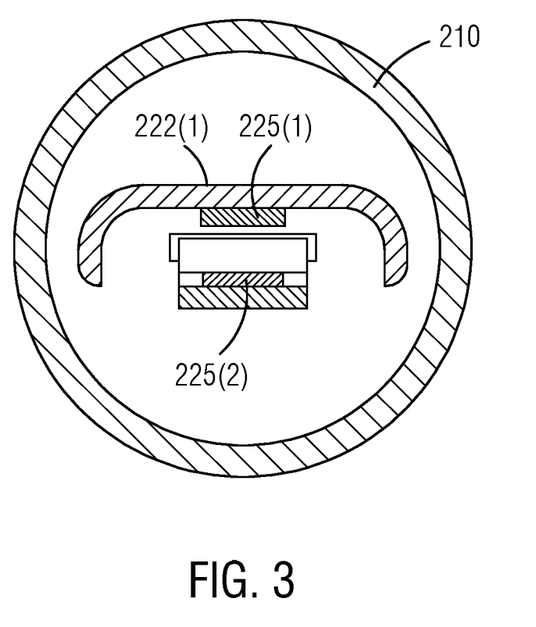
FIG. 3 illustrates a cross-sectional view of the vacuum gap section of FIG. 2 at a line A-A' in accordance with an exemplary embodiment of the present invention.

Turning now to FIG. 3, it illustrates a cross-sectional view of the vacuum gap section 205 of FIG. 2 at a line A-A' in accordance with an exemplary embodiment of the present invention.

Figure 4:
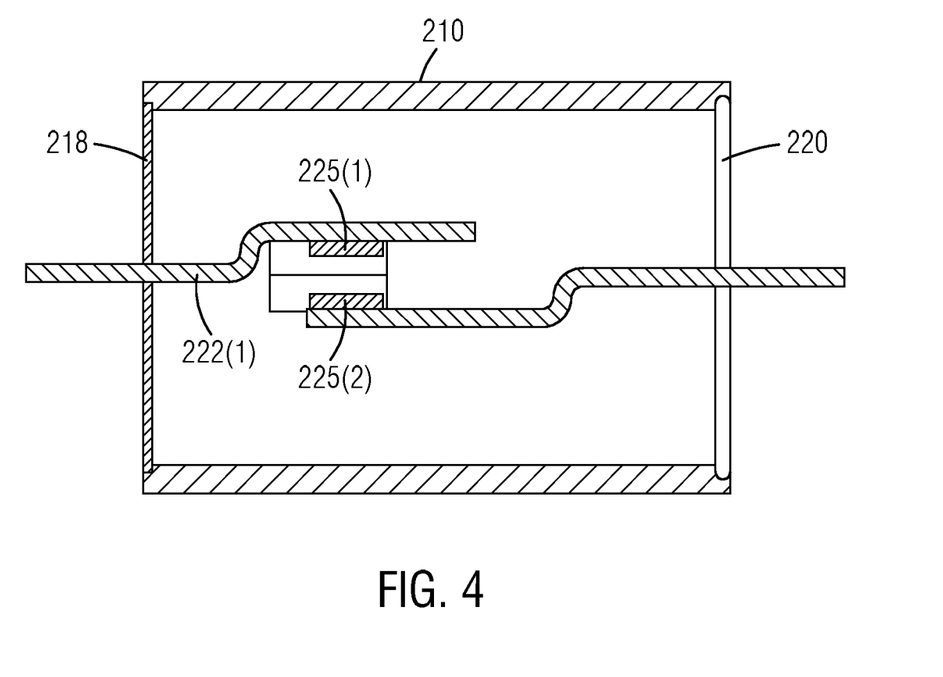
FIG. 4 illustrates a cross-sectional view of the vacuum gap section of FIG. 2 at a line B-B' in accordance with an exemplary embodiment of the present invention.

FIG. 4 illustrates a cross-sectional view of the vacuum gap section 205 of FIG. 2 at a line B-B' in accordance with an exemplary embodiment of the present invention.

Figure 5:
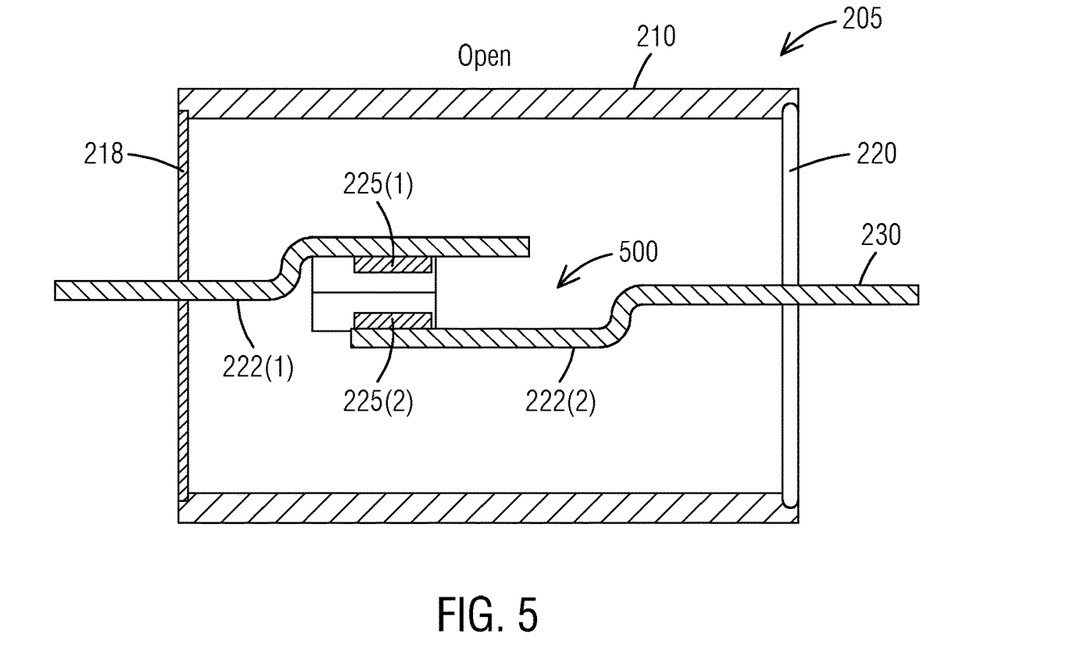
FIG. 5 illustrates a cross-sectional view of the vacuum gap section of FIG. 3 to show an open operation of the vacuum gap section in accordance with an exemplary embodiment of the present invention.

As seen in FIG. 5, it illustrates a cross-sectional view of the vacuum gap section 205 of FIG. 3 to show an open operation 500 of the vacuum gap section in accordance with an exemplary embodiment of the present invention.

Figure 6:
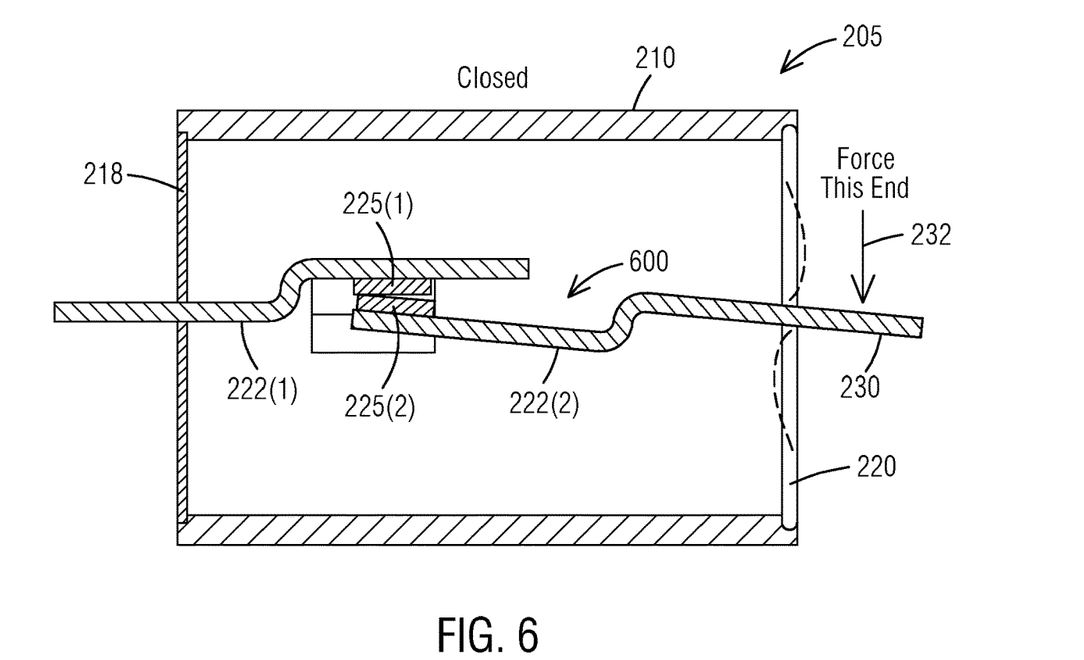
FIG. 6 illustrates a cross-sectional view of the vacuum gap section of FIG. 3 to show a close operation of the vacuum gap section in accordance with an exemplary embodiment of the present invention.

As shown in FIG. 6, it illustrates a cross-sectional view of the vacuum gap section 205 of FIG. 3 to show a close operation 600 of the vacuum gap section in accordance with an exemplary embodiment of the present invention.

In operation, a portion of the second contact terminal 222(2) may be moved outside of the glass sealed vacuum tube 210 by the force 232 such that the movable contact 225(2) may be opened or closed onto the fixed contact 225(1). The end spring 220 deforms and the motion of the movable arm is a pivoting motion instead of a linear motion by bellows. Instead of arc shields the first and second features 227(1-2) for protection from the arcs are provided. Embodiments of the present invention, however, are not limited to use in the described devices or methods.

Figure 7:
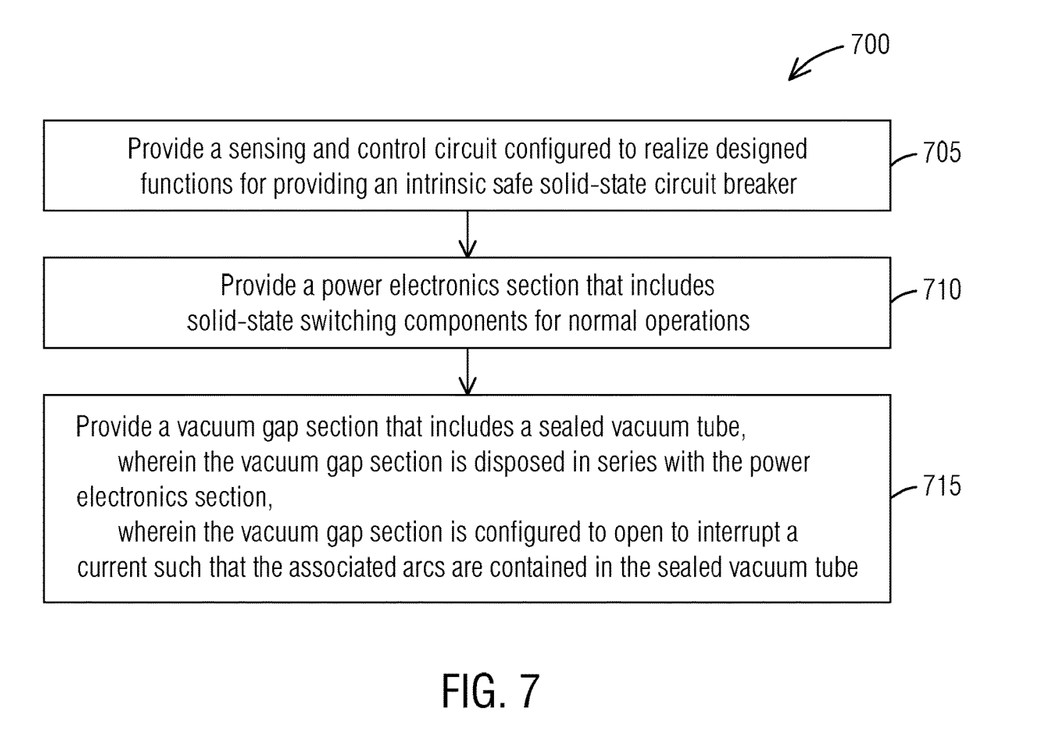
FIG. 7 illustrates a method for providing an intrinsic safe solid-state circuit breaker in accordance with an exemplary embodiment of the present invention.

In FIG. 7, it illustrates a method 700 for providing an intrinsic safe solid-state circuit breaker in accordance with an exemplary embodiment of the present invention. Reference is made to the elements and features described in FIGS. 1-6. It should be appreciated that some steps are not required to be performed in any particular order, and that some steps are optional.

The method 700 comprises a step 705 of providing a sensing and control circuit configured to realize designed functions. The method 700 further comprises a step 710 of providing a power electronics section that includes solid-state switching components for normal operations. The method 700 further comprises a step 715 of providing a vacuum gap section that includes a sealed vacuum tube. The vacuum gap section is disposed in series with the power electronics section. The vacuum gap section is configured to open to interrupt a current such that the associated arcs are contained in the sealed vacuum tube.

While a vacuum gap section operational with a pivoting motion is described here a range of one or more other types of vacuum gap sections are also contemplated by the present invention. For example, other types of vacuum gap section may be implemented based on one or more features presented above without deviating from the spirit of the present invention.

The techniques described herein can be particularly useful for a vacuum gap section for use in a low voltage, low current application a. While particular embodiments are described in terms of the vacuum gap section embedded within a low voltage residential circuit breaker, the techniques described herein are not limited to the a low voltage residential circuit breaker but can also be used with other systems such as power distribution systems where circuit breakers are deployed.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A solid-state circuit breaker comprising:
    a sensing and control circuit configured to realize designed functions;
    a power electronics section that includes solid-state switching components for normal operations;
    a vacuum gap section that includes a sealed vacuum tube, wherein the vacuum gap section is disposed in series with the power electronics section, and wherein the vacuum gap section is configured to open to interrupt a current such that the associated arcs are contained in the sealed vacuum tube;
    a first overvoltage protection device in parallel to the solid-state switching components;
    wherein the solid-state switching components includes a first solid-state component and a second solid-state component and wherein the first overvoltage protection device is provided to protect the solid-state switching components during an overvoltage after interruptions;
    a second overvoltage protection device for protecting the sensing and control circuit; and
    a vacuum gap actuator placed in series with a switching component, and both disposed in parallel to the sensing and control circuit,
    wherein the first and second solid-state components may be a single component or multiple components connected in parallel.

2. The solid-state circuit breaker of claim 1, wherein the sealed vacuum tube has a first end and a second end such that the sealed vacuum tube is being closed at the first end with an end plate and closed at the second end with an end spring, wherein the vacuum gap section further comprises a first contact terminal passing through the end plate and having a fixed contact near a distal end of the first contact terminal, wherein the first contact terminal has a first feature to protect from arcs by limiting access of the arcs to other components, wherein the vacuum gap section further comprises a second contact terminal having a free end, wherein the second contact terminal passing through the end spring and having a movable contact being configured to contact the fixed contact of the first contact terminal, wherein the second contact terminal having a second feature to protect from the arcs by limiting access of the arcs to the other components, and wherein the end spring is configured to receive a force on the free end of the second contact terminal to provide open or close operations of the vacuum gap section.

3. The solid-state circuit breaker of claim 2, wherein the fixed contact is mounted on the first contact terminal which is in turn mounted on the end plate and the sealed vacuum tube comprising at least one of a group of materials including a glass, a ceramic, and a glass-ceramic.

4. The solid-state circuit breaker of claim 3, wherein the fixed contact is welded on the first contact terminal.

5. The solid-state circuit breaker of claim 3, wherein the fixed contact is riveted on the first contact terminal.

6. The solid-state circuit breaker of claim 3, wherein the first contact terminal is brazed on the end plate and the end plate is sealed on the sealed vacuum tube.

7. The solid-state circuit breaker of claim 3, wherein the first contact terminal is soldered on the end plate and the end plate is sealed on the sealed vacuum tube.

8. The solid-state circuit breaker of claim 2, wherein the movable contact is mounted on the second contact terminal being a movable arm which is mounted on the end spring.

9. The solid-state circuit breaker of claim 8, wherein the movable contact is welded on the movable arm.

10. The solid-state circuit breaker of claim 8, wherein the movable contact is riveted on the movable arm.

11. The solid-state circuit breaker of claim 8, wherein the movable arm is brazed on the end spring and the end spring is sealed on the sealed vacuum tube.

12. The solid-state circuit breaker of claim 8, wherein the movable arm is soldered on the end spring and the end spring is sealed on the sealed vacuum tube.

13. The solid-state circuit breaker of claim 8, wherein by moving a portion of the movable arm outside the sealed vacuum tube, the movable contact is configured to be opened or closed onto the fixed contact.

14. The solid-state circuit breaker of claim 13, wherein the end spring deforms such that the motion of the movable arm is a pivoting motion.

15. The solid-state circuit breaker of claim 14, wherein the end spring having a material, a thickness and a diameter which are chosen in such a way that the end spring stays in an elastic range during the open or close operations.

16. A method for providing an intrinsic safe solid-state circuit breaker, the method comprising:
providing a sensing and control circuit configured to realize designed functions;
providing a power electronics section that includes solid-state switching components for normal operations;
providing a vacuum gap section that includes a sealed vacuum tube,
wherein the vacuum gap section is disposed in series with the power electronics section, and
wherein the vacuum gap section is configured to open to interrupt a current such that the associated arcs are contained in the sealed vacuum tube;
providing a first overvoltage protection device in parallel to the solid-state switching components,
wherein the solid-state switching components includes a first solid-state component and a second solid-state component and wherein the first overvoltage protection device is provided to protect the solid-state switching components during an overvoltage after interruptions;
providing a second overvoltage protection device for protecting the sensing and control circuit; and
providing a vacuum gap actuator placed in series with a switching component, and both disposed in parallel to the sensing and control circuit,
wherein the first and second solid-state components may be a single component or multiple components connected in parallel.

17. The method of claim 16, wherein the sealed vacuum tube has a first end and a second end such that the sealed vacuum tube is being closed at the first end with an end plate and closed at the second end with an end spring, wherein the vacuum gap section further comprises a first contact terminal passing through the end plate and having a fixed contact near a distal end of the first contact terminal, wherein the first contact terminal has a first feature to protect from arcs by limiting access of the arcs to other components, wherein the vacuum gap section further comprises a second contact terminal having a free end, wherein the second contact terminal passing through the end spring and having a movable contact being configured to contact the fixed contact of the first contact terminal, wherein the second contact terminal having a second feature to protect from the arcs by limiting access of the arcs to the other components, and wherein the end spring is configured to receive a force on the free end of the second contact terminal to provide open or close operations of the vacuum gap section.

18. The method of claim 17, wherein the fixed contact is mounted on the first contact terminal which is in turn mounted on the end plate and the sealed vacuum tube comprising at least one of a group of materials including a glass, a ceramic, and a glass-ceramic.

* * * * *